US007652477B2

(12) United States Patent  (10) Patent No.: US 7,652,477 B2
Candy  (45) Date of Patent: *Jan. 26, 2010

(54) MULTI-FREQUENCY METAL DETECTOR HAVING CONSTANT REACTIVE TRANSMIT VOLTAGE APPLIED TO A TRANSMIT COIL

(75) Inventor: Bruce Halcro Candy, Basket Range (AU)

(73) Assignee: Minelab Electronics Pty Ltd, Torrensville (AU)

( * ) Notice: Subject to any disclaimer, the term of this patent is extended or adjusted under 35 U.S.C. 154(b) by 232 days.

This patent is subject to a terminal disclaimer.

(21) Appl. No.: 10/577,673

(22) PCT Filed: Nov. 12, 2004

(86) PCT No.: PCT/AU2004/001555

§ 371 (c)(1),
(2), (4) Date: Apr. 28, 2006

(87) PCT Pub. No.: WO2005/047932

PCT Pub. Date: May 26, 2005

(65) Prior Publication Data

US 2008/0074114 A1  Mar. 27, 2008

(30) Foreign Application Priority Data

Nov. 12, 2003 (AU) .............................. 2003906218

(51) Int. Cl.
*G01V 3/10* (2006.01)
*G01V 3/11* (2006.01)
(52) U.S. Cl. ...................................................... 324/326
(58) Field of Classification Search .................. 324/67, 324/326, 327, 329; 340/551
See application file for complete search history.

(56) References Cited

U.S. PATENT DOCUMENTS

| 4,563,644 | A | | 1/1986 | Lenander et al. |
| 4,942,360 | A | | 7/1990 | Candy |
| 5,537,041 | A | | 7/1996 | Candy |
| 5,576,624 | A | * | 11/1996 | Candy ........................ 324/329 |
| 7,474,102 | B2 | * | 1/2009 | Candy ........................ 324/326 |
| 2004/0189302 | A1 | | 9/2004 | Yoshida |

OTHER PUBLICATIONS

International Search Report for PCT/AU2004/001555 dated Jan. 17, 2005 (4 pages).

* cited by examiner

*Primary Examiner*—Kenneth J Whittington
(74) *Attorney, Agent, or Firm*—Beyer Law Group LLP

(57) ABSTRACT

An electronic metal detector having a transmit coil (1) adapted to transmit an alternating magnetic field associated with a reactive transmit voltage, wherein the transmit voltage signal is selected such that the reactive transmit voltage is approximately constant for at least a time period during which a magnetic field signal to be processed is received by the detector for processing.

11 Claims, 5 Drawing Sheets

MULTI-FREQUENCY METAL DETECTOR HAVING CONSTANT REACTIVE TRANSMIT VOLTAGE APPLIED TO A TRANSMIT COIL

TECHNICAL FIELD

This invention relates to metal detectors and methods of metal detection.

The invention relates in particular to a method of assisting accuracy of generation of a constant reactive voltage and of implementing low power electronic circuitry whilst maintaining constant reactive transmit voltages.

This invention has particular application to metal detectors which are to operate in environments of varying magnetic permeability, such as magnetic soils, which may alter the inductance of a transmit coil during interrogation of such an environment.

BACKGROUND ART

A reactive transmit voltage may have a waveform such as a rectangular waveform or a pulsed signal sequence, depending on a required application.

The concepts described herein are also useful for the detection of conductors whether these are ferrous materials or non-ferrous materials but which are relatively good electrical conductors in environments containing relatively mildly conducting materials.

A general form of most metal detectors which are used to interrogate soils is a hand-held battery operated unit, a conveyor mounted unit, or a vehicle mounted unit.

Examples of hand-held products include detectors used to locate gold, explosive land-mines, coins and treasure. Examples of conveyor-mounted units include tramp metal or fine gold detectors in ore mining operations and industrial metal detectors to locate contaminants in food or pharmaceutical products, and examples of vehicle-mounted detectors include metal detector arrays used to locate explosive land-mines. These units usually consist of a transmit coil to transmit an alternating magnetic field associated with a reactive transmit voltage, transmit electronics which generate a transmit signal applied to the transmit coil, and receive electronics which receive a magnetic field and process received signals to produce an indicator output. By far the most numerous products of the above examples are the hand-held battery operated products. It is desirable that these have low power consumption to maximise battery life.

A transmit coil may be approximately represented as consisting of an effective inductive component impedance in series with an effective resistive component impedance which may include resistance of cabling and connectors and some elements of the transmit electronics.

One problem with metal detectors which transmit more than one frequency and are used to search an environment of varying magnetic permeability such as magnetic soils, is that the transmit coil's effective inductive component impedance is modulated by variable magnetic permeability, which in turn alters a reactive transmit voltage by differing amounts at different frequencies. Considering that a principal advantage of such metal detectors usually lies in an ability to compare a received magnetic signal interrogation of the environment at different frequencies (or frequency profiles), a different modulation of the transmit reactive voltage at different frequencies creates inaccuracies in useful received and processed signal calculations. In practice effective inductive component impedance may vary by up to a few percent in the most permeable soils.

Examples of multi-frequency transmission include simultaneous sinewaves, and all forms of "time domain" pulsed or rectangular waveforms. Pulsed or rectangular waveforms effectively transmit many frequencies as is known from Fourier analysis. Examples (which are not considered to be mere paper publications and are not acknowledged as being common general knowledge of multi-frequency transmission in magnetic soils) are given in U.S. Pat. No. 4,942,360 and examples of rectangular waveform transmission in magnetic soils are given in U.S. Pat. No. 5,537,041. The invention described herein may be advantageous over the art disclosed in these mere patent publications.

Accordingly a voltage applied to a transmit coil may be considered to have approximately two series voltage components. One results from an effective reactive transmit voltage ($Vx$) (non-energy dissipative, magnetic) across a transmit coil's effective inductive component impedance ($X$), and the other an effective resistive voltage component ($Vr$) (energy dissipative, non-magnetic) across a transmit coil's effective resistive component impedance ($R$). A vector sum of these two effective voltage components equals an applied voltage ($Vapplied$). That is, in terms of a sinewave of frequency $w$, $Vapplied = Vr + Vx$, where $$Vresistive = Vr = Vapplied(R/(sqrt(R^2+X^2))) = Vapplied(R/sqrt(R^2+(wL)^2)) \quad (i),$$

$$Vreactive = Vx = Vapplied(X/(sqrt(R^2+X^2))) = Vapplied(jwL/sqrt(R^2+(wL)^2)) \quad (ii)$$

Where for a sinewave frequency $w$, $X=jwL$ where $L$ is the effective transmit coil inductance, and the total effective series impedance is $$Z = X + R = jwL + R \quad (iii)$$

An alternating magnetic field transmitted by the transmit coil is only related to the effective reactive transmit voltage component while the effective resistive transmit voltage component contributes nothing to this field. This transmitted magnetic field may induce both resistive and reactive magnetic fields in an environment owing to the properties of the environment which may in turn induce voltage signals in a receive coil used for magnetic reception. This induced voltage is applied to receive electronics for processing for assessment of the magnetically interrogated environment.

For two equal voltages applied to the transmit coil ($Vapplied$) at frequency $w1$ and $w2$, the ratio of the respective effective reactive transmitted voltage components at $w1$ and $w2$ equals $$Ratio12 = sqrt(((R/w2)^2 + L^2)/((R/w2)^2 + (w1/w2)^2 L^2)) \quad (iv)$$

To highlight that this is a function of $L$, this may be rewritten as $$Ratio12 = sqrt((k1+L^2)/(k1+k2L^2)) \quad (v)$$

Where $k1$ and $k2$ are constants and the salient point is that $k2$ is not equal to 1.

In most multi-frequency transmission metal detector systems, the transmit/receive coil usually is a transmit coil plus a receive coil intrinsically nulled, but imperfectly so. Owing to both magnetic and capacitive coupling, the intrinsic coupling between the transmit and receive coil in practice is un-nulled and frequency dependent. The un-nulled components are usually temperature dependent.

Hence if the reactive transmit voltage varies differently at different frequencies with variations in $L$, one received component at one frequency may not be compared to another without knowledge of $L$, the properties of the transmit/receive coil null (and k1 and k2). This requires several different measurements and requires complex calculations.

DISCLOSURE OF THE INVENTION

In order to avoid these complex measurement and compensating calculations, an answer according to this invention is to maintain a substantially constant ratio between the reactive transmit voltage components at frequencies of receiving relevance, that is Vapplied should be varied by differing amounts at different frequencies to compensate for environmental modulation of the transmit coil's inductive component impedance.

This may be achieved in two alternate ways: which is to say by keeping the reactive transmit voltages constant or by keeping the reactive transmit voltages at frequencies to be received and processed constant relative to each other but not necessarily constant in absolute magnitude.

The second method has problems with the coil null, but in practice is still better than no compensation whatever.

One way of satisfying the second method is by maintaining a constant transmit coil current waveform. One way this may be achieved is by the use of a current generator with the desired transmit current waveform connected to the transmit coil.

One way of satisfying the first method is by feeding a transmit coil (plus connecting leads and connectors etc) with a negative resistance approximately equal to the total (positive) resistance of effective transmit coil's series effective resistive impedance plus that of the transmit coil's leads and connectors (if any) connecting to the electronics, plus any series effective output (positive) resistance of any other transmit electronics circuitry connected to the transmit coil. This circuit arrangement cancels the total series effective resistive impedance of the transmit coil and may thus be driven by a fixed applied voltage waveform which therefore approximately equals a fixed effective reactive transmit voltage.

No matter how the transmit electronic circuits are designed to satisfy the requirement of the transmitter being capable of transmitting constant reactive transmit voltage waveforms, under varying transmit coil inductance conditions, all such electronic circuits must contain at least one linear amplifier and an alternating varying voltage output (or fixed current waveform which results in a varying voltage) applied to the transmit coil to achieve the required compensation.

Electronic circuitry arrangements which will provide low power consumption include inductive/capacitive resonators at the transmitted frequencies in the case of (pure) multi-sinewave transmission; and class-D amplifiers which transmit the desired waveform The multi-frequency inductive/capacitive resonator systems plus circuitry required to maintain frequency independent reactive transmit voltage in variable transmit coil inductance conditions are relatively expensive.

So too are class-D amplifiers plus circuitry required to maintain frequency independent reactive transmit voltage in variable transmit coil inductance conditions.

It is also possible to employ a combination of switching transmit waveforms generated by low on resistance/high off resistance switches connected to power rails connected to relatively high valued storage capacitors.

Certain circuit arrangements using this system are capable of low cost implementation and relatively simple circuits, even if this includes circuitry to compensate for frequency dependent transmit coil inductance modulation and thus to maintain constant reactive transmit voltages. This will require in addition at least one linear transmit amplifier connected to a lower voltage power supply than the switching circuitry power supply voltage, with the linear amplifier's power supplies connected to the switching power supplies.

Here "linear" amplifier may mean an analogue amplifier or a digital switching class-D amplifier controlled for example, by dsp circuitry. The class-D amplifiers are more expensive and complex than analogue counterparts.

Examples of some useful metal detectors of this type include a "frequency domain" multi-frequency detector which has switched transmit waveforms producing relatively strong (Fourier component) transmissions at the desired operational frequencies, say for example three frequencies, plus receive demodulation at these said multi-frequency (say three) frequencies, followed by filtering.

U.S. Pat. No. 4,942,360 describes useful demodulation processing;

a "time domain" continuous transmitting switched rectangular reactive voltage waveform which incorporates just two transmitted reactive voltage levels; one positive and the other negative, plus receive demodulation synchronised to the transmit waveform followed by filtering.

U.S. Pat. No. 5,537,041 describes useful demodulation processing:

a "time domain" continuous transmitting three different reactive voltage level switched rectangular waveforms; one reactive transmit voltage being positive another negative and the other zero, plus receive demodulation synchronised to the transmit waveform, particularly during the zero reactive voltage transmission followed by filtering. Here the transmit coil current waveform during the zero reactive voltage transmission may be non-zero unlike pulse induction metal detectors for example, which also have periods of zero reactive transmit voltage but simultaneous zero transmit current.

Similar demodulation processing described in U.S. Pat. No. 5,576,624 may produce high performance detection in magnetic soils.

The current flowing in an inductor is proportional to the integral of the (series) reactive voltage component across the effective series inductive impedance component. Thus the (series) resistive voltage component equals this current multiplied by the effective series resistive component impedance. Thus if the desired current through the transmit coil is to be proportional to the integral of the switched transmit voltage waveform, then the voltage applied to the transmit coil must equal the switched transmit voltage plus a voltage proportional to the integral of the switched transmit voltage. That is $$V\text{applied}=V\text{switched}+\text{integral}(V\text{switched})R/L \qquad (vi).$$

The latter source equal to integral(Vswitched)R/L may be implemented by including the use of a linear amplifier. In order to minimise power consumption, the supply to the linear amplifier should be as low as possible, so that output saturation is just avoided.

Consider the simple case of a squarewave transmission at say 2.5 kHz, a switched transmit voltage of +/−5V (10V peak-to-peak) which equals the desired reactive transmit voltage, a transmit coil of 0.25 mH effective series inductance and effective series resistance of 0.5 ohm which includes leads and connectors to the electronics plus the effective output impedance of the switched transmitter electronics, which may include, for example a series large valued decoupling electrolytic capacitor. The desired peak current is therefore (5V×(1/(4×2500)) seconds)/0.25 mH=2 A (=4 A peak-to-peak).

Thus the required compensating triangular wave (the integral of a square wave) which need be generated at the linear amplifier's output is 2 A×0.5 ohm=1V peak (2V peak-to-peak). A suitable supply to the linear amplifier for such a system may be say 2.5V to allow for a little headroom. This is a typical logic-level power supply which may be simultaneously used by a microprocessor and for other logic. Here, the switching electronics may be connected to one end of the transmit coil via a series capacitance of say 20,000 microfarad, and the linear amplifier's output to the other end of the transmit coil; both connections being via leads and a connector for example. The series capacitance required for D.C. blocking effectively reduces the inductance by a small fraction (approx 1%), and of course need be taken into account in calculations.

In one form, the invention may be said to reside in an electronic metal detector having a transmit coil adapted to transmit an alternating magnetic field associated with a reactive transmit voltage, transmit electronics adapted to generate a transmit voltage signal which is applied to the transmit coil, receive electronics adapted to receive a magnetic field signal and process received signals to produce an indicator output, wherein the transmit voltage signal is selected such that the reactive transmit voltage is approximately constant for at least a time period during which a magnetic field signal to be processed is received by the receive electronics.

In preference the transmit electronics includes a linear amplifier and switching voltage electronics, the switching voltage electronics being adapted such that the transmit voltage signal includes a switched voltage component including periods of at least two different switched voltages, a first switched voltage during a first period, and second switched voltage during a second period, the linear amplifier being adapted such that the transmit voltage signal includes a component which changes approximately linearly in time during a third period which is within the said first period, the receive electronics receiving during at least a period during the third period, wherein the transmit voltage signal is selected such that the reactive transmit voltage is approximately constant during the third period for a selected range of transmit coil effective inductive component impedance.

In preference the switched voltage component includes a sequence of switched voltage periods selected such that Fourier components of this sequence contain at least two frequencies of substantial magnitude, the receive electronics being adapted to be responsive and to receive signals for processing at least the said at least two frequencies, further characterised in that a ratio of reactive transmit voltages at each of the said at least two frequencies is substantially constant for the said selected range of transmit coil effective inductive component impedance.

In one form, the reactive transmit voltage is approximately zero during the third period.

In preference the transmit electronics is adapted to effect an effective negative resistance which is selected to be approximately equal in magnitude but opposite to the resistance of the effective resistive component impedance met by the transmit voltage signal, the negative effective resistance being in series with the transmit coil.

In preference the transmit electronics is adapted to effect a ramp voltage which is approximately proportional to the integral of the switched voltage component.

In preference, in the alternative, the transmit electronics is adapted to effect a ramp current which is approximately proportional to the integral of the switched voltage component.

In preference the switching voltage electronics includes power supply storage capacitors and wherein the forward transfer gain of the ramp voltage is controlled by a servo-loop which is adapted to maintain low constant current flow to the switching voltage electronics, the storage capacitors being adapted to store charge, some of which charge will flow back and forth through the switching voltage electronics and transmit coil.

BRIEF DESCRIPTION OF THE DRAWINGS

To assist with the understanding of this invention, reference will now be made to the drawings wherein.

BEST MODE FOR CARRYING OUT THE INVENTION

Figure 1:
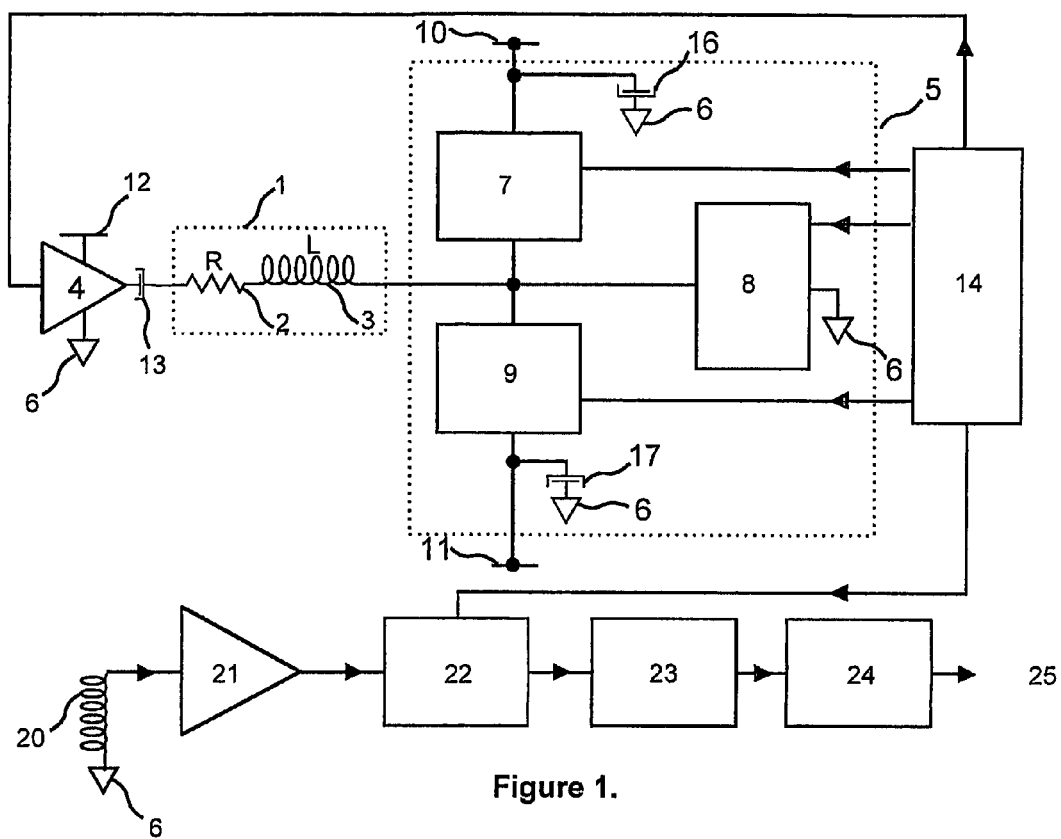
FIG. 1 shows an electronic system constructed according to the invention capable of transmitting a reactive transmit voltage independent of transmit coil inductance, and includes a 3-level switched transmit voltage generator, plus a linear generator.

Referring specifically to the drawing transmit coil 1 approximately may be represented by an effective resistance component impedance 2 of value R in series with an effective inductive component impedance 3 of inductance value L. This is connected to transmit electronics which may generate a transmit signal applied to the transmit coil. This transmit electronics may include a series capacitor 13 connected to an active generator 4 which includes at least a linear amplifier. The transmit electronics also includes switching voltage electronics 5 which in this example consists of three low impedance solid state switches 7, 8 and 9, which is also connected to the transmit coil. Switch 7 is connected to a power supply supplying supply input 10, switch 9 to a power supply supplying supply input 11 and switch 8 to earth 6. Power supply input 10 is a.c. coupled to earth via storage capacitor 16 and power supply input 11 is a.c. coupled to earth via storage capacitor 17. The switches 7, 8 and 9 are controlled to be on or off by timing control circuit 14. Receive electronics includes a receive coil 20 which is connected to preamplifier 21 which feeds demodulators 22. These feed low pass filters 23 which remove transmit frequencies from the signals supplied by 22. Signals from these low pass filters are then processed in processor 24 to produce an indicator signal 25. Demodulation may be achieved by dsp or synchronous switched demodulation techniques. This is controlled by timing control circuit 14 as well. Generator 4 is supplied by earth and a power supply at 12, which for minimum power consumption should supply a voltage just greater than the peak-to-peak output voltage of generator 4. For certain systems, timing control circuit 14 may supply a signal to generator 4.

In an alternative preferred embodiment, generator 4 may be implemented as a negative resistance generator to compensate R which may includes the resistance of the transmit coil cabling plus connector.

A constant transmit reactive voltage waveform may be generated which equals the switched voltage component, independent of L.

In an alternative preferred embodiment, generator 4 may be implemented as a current generator wherein the current waveform is approximately proportional to the integral of the switched transmit voltage at the node of switches 7, 8 and 9.

The current waveform will be in the form of a ramp with a constant alternating sign slope associated with the transmit switched voltage component sign. This current waveform slope is zero if the transmit switched voltage component is zero. For a fixed current waveform, there is no need to connect power supplies to 10 and 11 as the voltage across storage capacitors 16 and 11 will be self-levelling. In this case the independence of the reactive transmit voltage to changes in transmit coil inductance is valid assuming low losses in the switching voltage electronics. The current defines the relative (but not absolute) reactive transmit voltages to be in constant proportion at different frequencies independent of transmit inductance.

In an alternative preferred embodiment, generator 4 may be implemented as a voltage generator wherein the output voltage waveform is approximately proportional to the integral of the switched transmit voltage at the node of switches 7, 8 and 9.

The absolute voltage level may be changed to compensate for changes in transmit inductance. This may be achieved by either monitoring the transmit current and employing a negative feedback servo-loop system to maintain this to be constant by altering the forward transfer gain of generator 4, that is the magnitude of the integral of the switched voltage waveform which generates a ramp voltage waveform is altered; or monitoring the current supplied by the supplies feeding 10 and 11 and again employing a negative feedback servo-loop system to maintain this to be constant and near zero, by altering the forward transfer gain of the voltage ramp generated in generator 4.

Alternatively the voltage waveform at the output of generator 4 may be kept constant and power supplies feeding 10 and 11 removed which will result in a "self-levelling" dc voltage across storage capacitors 16 and 17.

Figure 2:
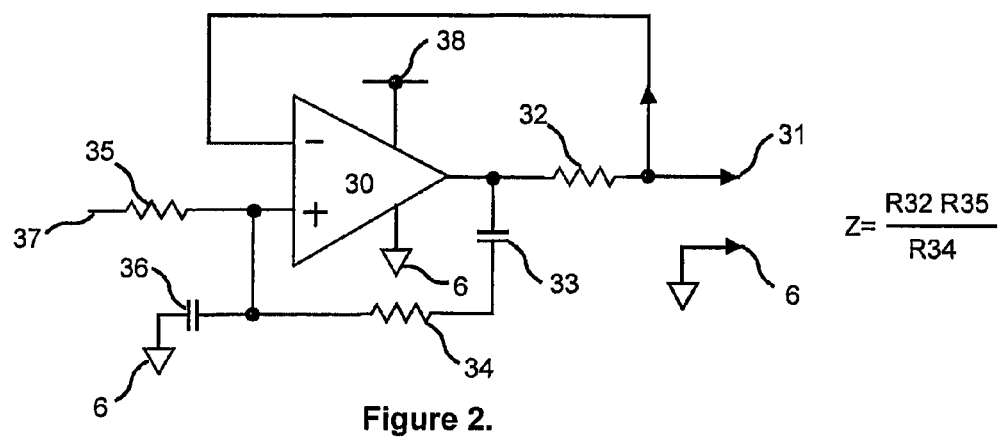
FIG. 2 shows an example of a negative resistance generator which includes at least a linear amplifier.

FIG. 2 shows an example of a negative resistance generator. This includes a linear operational amplifier 30 which is connected to a low value resistor 32 which supplies the generator's output 31. 31 is fed back to the inverting input as a negative feedback path. The output of the operational amplifier is connected to the non-inverting input via a series capacitor 33 and resistor 34 as a positive feedback path. This positive feedback path is attenuated by means of a load consisting of resistor 35 connected to a voltage reference 37 and capacitor 36 connected to earth. The low frequency positive feedback is attenuated at low frequencies by 33/34/35 and the high frequencies by capacitor 36. This is necessary for both low and high frequency stability. The output impedance is approximately $$Z = -R32 R35/R34.$$

To compensate for the variable voltage drop across R as the inductance L is modulated by magnetic soils, −Z should be set close in value to R. For example, if R is say 0.5 ohm, and R32 is chosen to be say 0.1 ohms, R34 to be 100 ohms and R35 say 470 ohms, this will result in a near constant reactive transmit voltage. Capacitor 36 should at least compensate the effective parallel capacitance of the transmit coil and the time constant of C33(R34+R35) should be substantially greater than the lowest relevant transmit fundamental period of the transmit waveform, say >100 times.

(A similar system may be implemented using dsp circuitry and a class-D amplifier for example.)

Figure 3:
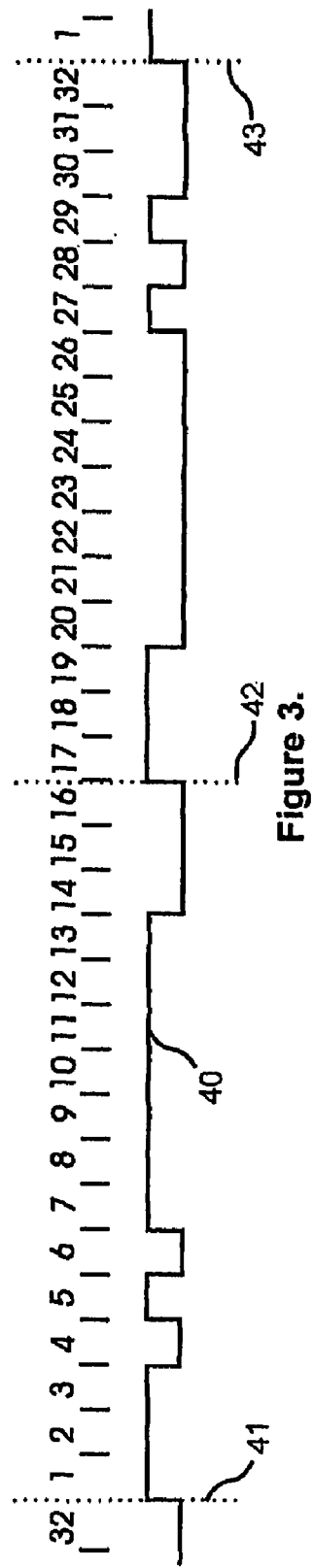
FIG. 3 shows waveforms for an embodiment of the invention including a 2-level switched transmit voltage generator which generates 3 frequencies of reasonable strength, suitable for dsp-sinewave demodulation.

FIG. 3 shows a simple example of a 2-level transmit switched voltage component waveform which generates a sequence of switched voltage periods selected to contain at least 3 Fourier component frequencies of substantial magnitude:

one with a period equal to the fundamental period of the waveform defined to be between 41 and 43, another 4 times this frequency and another 16 times the fundamental frequency.

In this example, the waveform happens to have an inverted symmetry relative to 42. The numbers above the waveform indicate a clock counter for ease of understanding.

For typical soil searching applications to search for military land-mines, gold nuggets or coins, the fundamental frequency may be in the region of 1 to 4 kHz, say 3 kHz, in which case the mid-frequency in this example is 12 kHz and the higher frequency 48 kHz. These may be "sinewave" demodulated in the receive electronics by dsp circuits for example. These demodulated signals may then be further processed for an indicator output.

Figure 4:
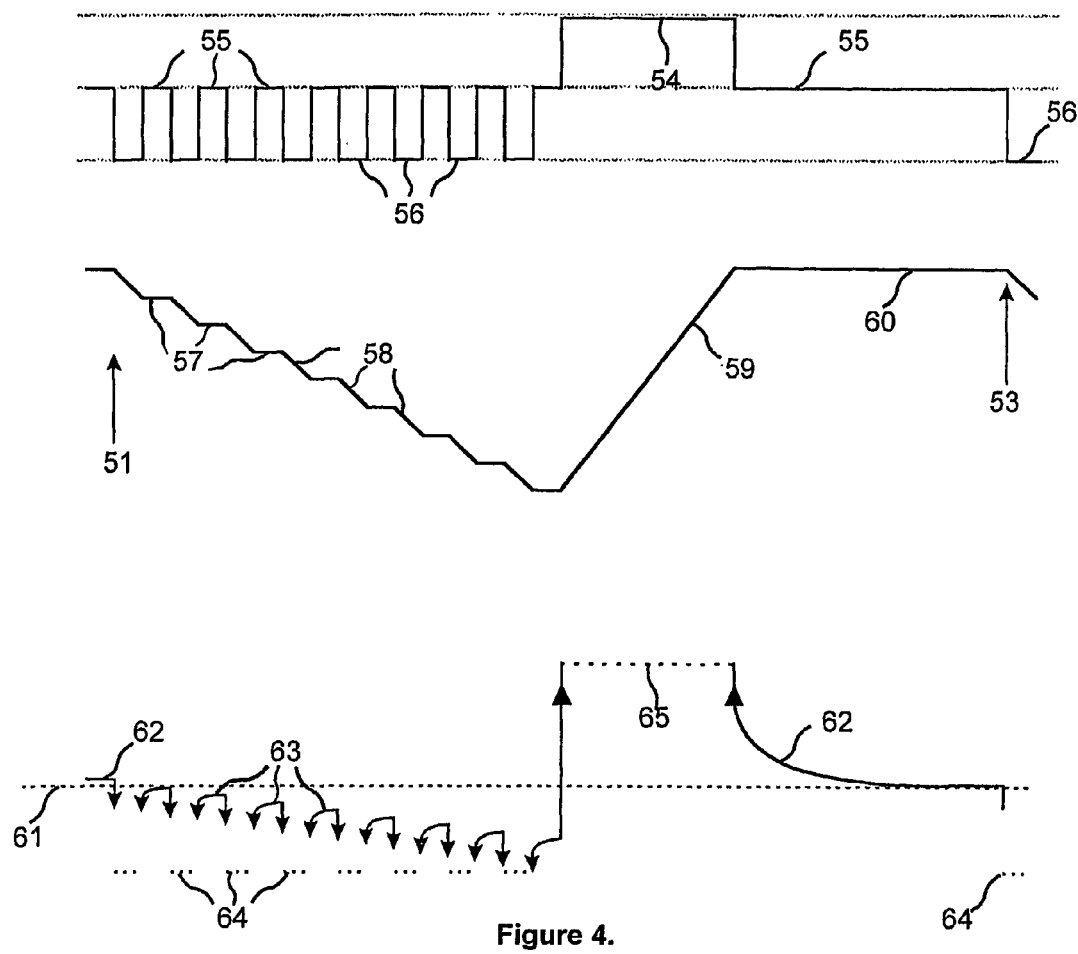
FIG. 4 shows voltage waveforms and transmit coil current waveforms for an embodiment of the invention including a of a 3-level switched transmit voltage generator.

FIG. 4 shows an example of a 3-level switched reactive transmit voltage waveform, and corresponding current and receive waveforms. The output levels of the switched voltage component of the switching voltage electronics are positive 54, earth 55 and negative 56. The fundamental period of the generated sequence is between 51 and 53 and the waveform is strongest at two different fundamental frequencies, one equal to that of the fundamental and the other 16 times the fundamental. The current waveform is shown as 57, 58, 59 and 60. The voltage waveform generated at the output of 4 is identical in shape to this current signal. This increases when the switched voltage waveform is positive, such as 59 during the long positive switched voltage level, decreases when the switched voltage waveform is negative, such as periods 58 during the short positive switched voltage level periods, and held constant during the periods when the switched voltage component is at earth (0V) potential such as periods 57 and 60. Periods 57 correspond to the short zero potential periods and 60 to the long period. These periods of constant current and zero reactive transmit voltage is only possible when the resistive transmit voltage component is reasonably accurately compensated, using for example, the circuit shown in FIG. 1. The periods of zero transmit reactive voltage is useful for reception with minimal reactive transmit voltage signal interference.

The receive signal is shown as the bottom waveform for the interrogation of magnetic soils with dominant reactive (non-dissipative "instantaneous") component but also a significant loss (dissipative "historic") component.

The period 62 shows the receive voltage waveform during the application of a long period zero reactive transmit switched voltage.

The period 63 shows the receive voltage waveform during the application of short period zero reactive transmit switched voltages.

The period 64 shows the receive voltage waveform on a different vertical scale (relatively compressed) during the application of the short periods of negative reactive transmit switched voltages.

The period 65 shows the receive voltage waveform also on a compressed vertical scale during the application of the long period positive reactive transmit switched voltage.

Note that during the short switching periods, both the long period and short period components are received simultaneously. Thus is reflected in a gradual change in the received loss component during zero reactive transmit voltage periods from one short period pulse to the next within a fundamental cycle.

As shown in the above figures, it is necessary that the switching voltage electronics produces at least two different switched voltages during at least two different periods, a least a first voltage during a first period and a second voltage during a second period.

In all the above examples, the reactive transmit coil voltage is held approximately constant throughout the entire transmit waveform. This is not necessarily to produce an indicator output which is independent of the transmit coil's effective inductive component impedance which may vary. It is necessary that the reactive transmit voltage is approximately constant during at least part of a transmit signal, say during a third period (which may occur within the first period for example), and that the receive electronics receives a magnetic field only within the (third) periods when the reactive transmit voltage is approximately constant, and this received signal is processed to give an indicator output.

Another useful application of the above principles of transmission of periods of constant reactive transmit voltage (wherein the transmit coil inductance need not vary significantly) is in conveyor mounted metal detectors used in industry for the detection of ferrous contamination in food or pharmaceuticals which may be associated with relatively mild conductivity of either the product packaging, such as aluminium foil, or intrinsic to the product such as moist salt. Examples of ferrous contamination include steel screws and staples. During periods of non-zero constant reactive transmit voltage, the induced eddy currents in the relatively mild conducting materials will decay relatively rapidly following a transition of the switched voltage component to a constant current. The constancy of this current depends on the constancy of the reactive transmit voltage. (If this is not constant, the eddy current decay will not be asymptotically constant.) This corresponds to an induced receive voltage decaying away relatively rapidly following a transition of the switched voltage component to an asymptotic zero voltage. However ferrous targets produce both an eddy current decay signal and a field-enhancing signal. If demodulation occurs during periods of constant reactive transmit voltage and during periods when the eddy current signal from the relatively mildly conductive medium has effectively (decayed) to zero, then signals from both ferrous targets and relatively longer period non-ferrous targets which may contaminate a product may be detected free from the decayed signal of the relatively mildly conducting material associated with the product. For example, for typical aluminium lids of about 10 cm or so diameter used to seal plastic containers, a square-wave transmit voltage signal of a few kHz or there about (depending on the aluminium thickness) is satisfactory, and the receive demodulation may occur during the last portion of each positive and negative period between square-wave transitions. For much thinner aluminium barriers lining plastic packets for example, this frequency may be increased by an order of magnitude or so.

Figure 5:
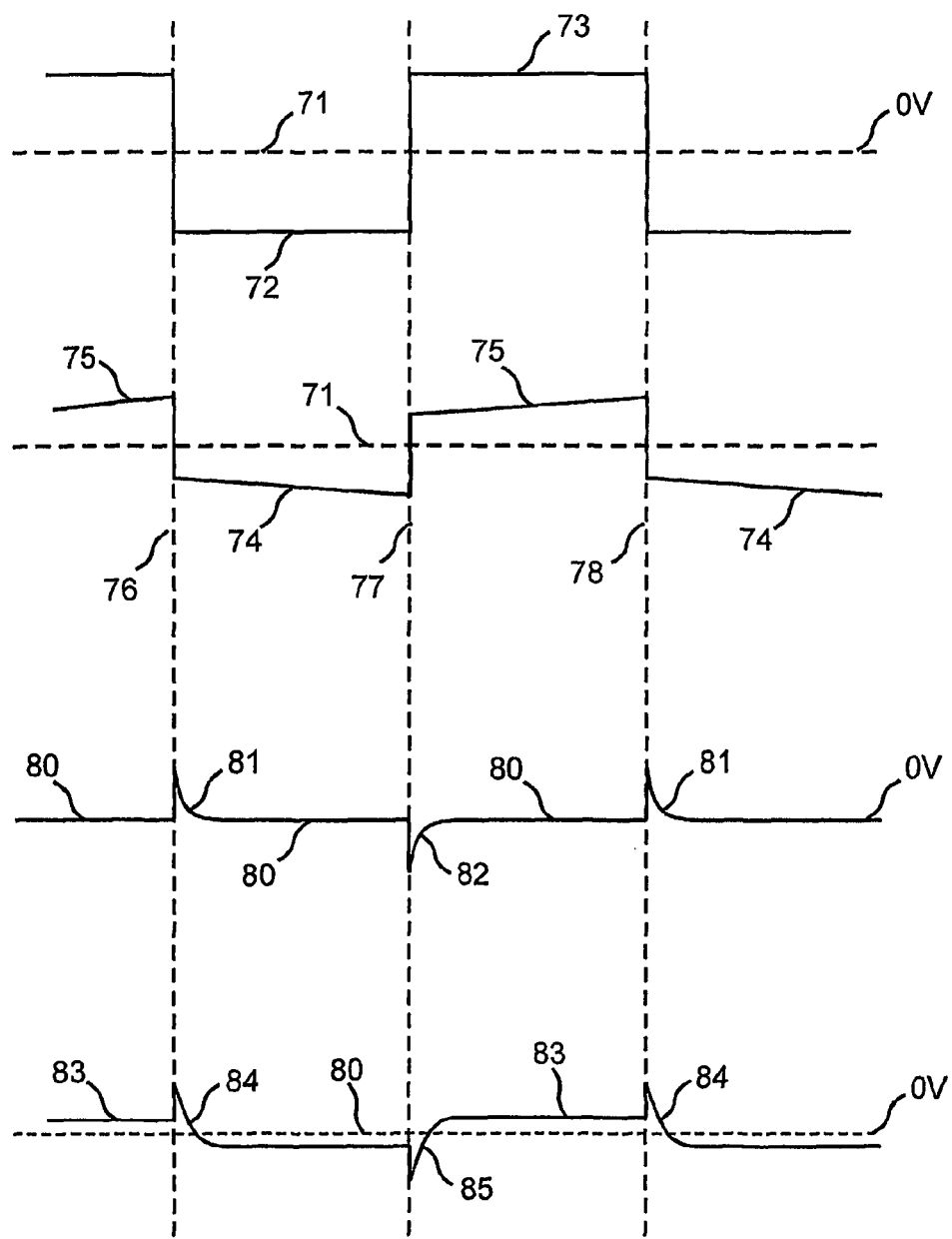
FIG. 5 shows an example of waveforms associated with a metal detector of the invention which is sensitive to ferrous contamination in products (free of ferrous material) associated with relatively mildly electrically conductive material.

FIG. 5 illustrates an example of typical waveforms of such a system. The top waveform is the desired reactive transmit voltage signal. The waveform below this is the transmit voltage waveform required to be applied to the transmit coil to achieve the top waveform, that is the square-wave plus a signal proportional to the integral of the square-wave, namely a triangular-wave to compensate for the transmit coil's effective series resistance. The second bottom waveform is the received voltage from the interrogation of relatively mildly conductive material associated with the product being interrogated by the metal detector. The bottom signal is that received from the interrogation of a ferrous target. For simplicity, both the receive signals are shown assuming a perfect transmit-receive coil null.

Here 72 is the negative transmit voltage (first switched voltage) during half of the square-wave period (first period), 73 is the positive voltage (second switched voltage) during half of the square-wave period (second period). This is symmetrical about zero volts 71. Both 72 and 73 are generated by the switching voltage electronics.

74 is the first switched voltage plus a ramp of negative slope, and 75 is the second switched voltage plus a ramp of positive slope. The ramps which sum to the triangular-wave are generated with the use of a linear amplifier.

80 is at zero volts. 81 is the induced voltage received signal resulting from the eddy current decay signal in the relatively mildly conductive material during the first period and 82 that received during the second period.

84 is the eddy current decay signal from a ferrous target plus a constant negative voltage component resulting from the magnetisation of the ferrous material during the first period, and similarly 85 is that received during the second period.

This system has advantages over the more common type of static field ferrous detectors in that it can be designed to be free of 1/f electronic noise owing to synchronous demodulation and thus also be insensitive to changes in the earth's field due to moving machinery in the factory for example. In addition, some of the more conductive non-ferrous targets may be detected owing to the relatively slower decay periods (e.g. coins) which is not possible with a static field.

Throughout this specification the purpose has been to illustrate the invention and not to limit this.

The invention claimed is:

1. An electronic metal detector having:
    a transmit coil adapted to transmit an alternating magnetic field associated with a reactive transmit voltage;
    transmit electronics adapted to generate a transmit voltage signal which is applied to the transmit coil; and
    receive electronics adapted to receive a magnetic field signal and process received signals to produce an indicator output,
    wherein the transmit voltage signal is selected such that the reactive transmit voltage is approximately constant for at least a time period during which a magnetic field signal to be processed is received by the receive electronics, and
    wherein a timing of both the transmit electronics and the receive electronics is controlled by a timing control circuit operating in the time domain.

2. A method of detection of metal for use in environments of varying magnetic permeability, including the use of an electronic metal detector as claimed in claim 1.

3. An electronic metal detector comprising:
    a transmit coil adapted to transmit an alternating magnetic field associated with a reactive transmit voltage;

transmit electronics adapted to generate a transmit voltage signal which is applied to the transmit coil, said transmit electronics comprising:

a linear amplifier and switching voltage electronics, the switching voltage electronics being adapted such that the transmit voltage signal includes a switched voltage component including periods of at least two different switched voltages, a first switched voltage during a first period, and second switched voltage during a second period, the linear amplifier being adapted such that the transmit voltage signal includes a component which changes approximately linearly in time during a third period which is within the said first period; and receive electronics adapted to receive a magnetic field signal and process received signals to produce an indicator output, the receive electronics receiving during at least a period during the third period, wherein the transmit voltage signal is selected such that the reactive transmit voltage is approximately constant during the third period for a selected range of transmit coil effective inductive component impedance.

4. The electronic metal detector as in claim 3 wherein said switched voltage component includes a sequence of switched voltage periods selected such that Fourier components of this sequence contain at least two frequencies of substantial magnitude, the receive electronics being adapted to be responsive and to receive signals for processing at least the said at least two frequencies, further characterised in that a ratio of reactive transmit voltages at each of the said at least two frequencies is substantially constant for the said selected range of transmit coil effective inductive component impedance.

5. The electronic metal detector as in claim 4 further characterised in that the reactive transmit voltage is approximately zero during the third period.

6. The electronic metal detector as in claim 3 wherein the transmit electronics is adapted to effect a ramp voltage which is approximately proportional to the integral of the switched voltage component.

7. The electronic metal detector as in claim 6 wherein the said switching voltage electronics includes power supply storage capacitors and wherein a forward transfer gain of the ramp voltage is controlled by a servo-loop which is adapted to maintain low constant current flow to the switching voltage electronics, the storage capacitors being adapted to store charge, some of which charge will flow back and forth through the switching voltage electronics and transmit coil.

8. The electronic metal detector as in claim 3 wherein the transmit electronics is adapted to effect a ramp current which is approximately proportional to the integral of the switched voltage component.

9. An electronic metal detector comprising:

a transmit coil adapted to transmit an alternating magnetic held associated with a reactive transmit voltage;

transmit electronics adapted to generate a transmit voltage signal which is applied to the transmit coil; and receive electronics adapted to receive a magnetic field signal and process received signals to produce an indicator output, wherein the transmit voltage signal is selected such that the reactive transmit voltage is approximately constant for at least a time period during which a magnetic field signal to be processed is received by the receive electronics, and wherein the transmit electronics is adapted to effect an effective negative resistance which is selected to be approximately equal in magnitude but opposite to the resistance of an effective resistive component impedance met by the transmit voltage signal, the negative effective resistance being in series with the transmit coil.

10. A method of detection of metal for use in environments of varying magnetic permeability, the method including steps of:

transmitting an alternating magnetic field associated with a reactive transmit voltage from a transmit coil;

generating a transmit voltage signal with transmit electronics and applying the signal to the transmit coil, wherein the transmit electronics comprises a linear amplifier and switching voltage electronics, switching voltage electronics being adapted such that transmit voltage signal includes a switched voltage components including periods of at least two different switched voltages, a first switched voltage during a first period, and second switching voltage during a second period, the linear amplifier being adapted such that transmit voltage signal includes a component which changes approximately linearly in time during a third period which is within the said first period;

receiving with receive electronics adapted to receive a magnetic field signal;

processing received signals to produce an indicator output, wherein the receive electronics receives during at least the period during the third period;

selection of the transmit voltage signal such that the reactive transmit voltage is approximately constant during the third period for a selected range of transmit coil effective inductive component impedance, wherein the switched voltage component includes a sequence of switched voltage periods selected such that Fourier components of this sequence contain at least two frequencies of substantial magnitude, the receive electronics being adapted to be responsive to and receive signals for processing at least the said at least two frequencies, further characterised in that a ratio of reactive transmit voltages at each of said at least two frequencies is substantially constant for the said selected range of transmit coil effective inductive component impedance.

11. The method of detection of metal as in claim 10 wherein the search signal is selected such that the reactive transmit voltage is approximately constant for at least a time period during which a magnetic field signal returned from a search environment is being received.

* * * * *